Feb. 2, 1943.　　B. E. SHERRILL　　2,310,041
COMPASS STRUCTURE
Filed March 6, 1941
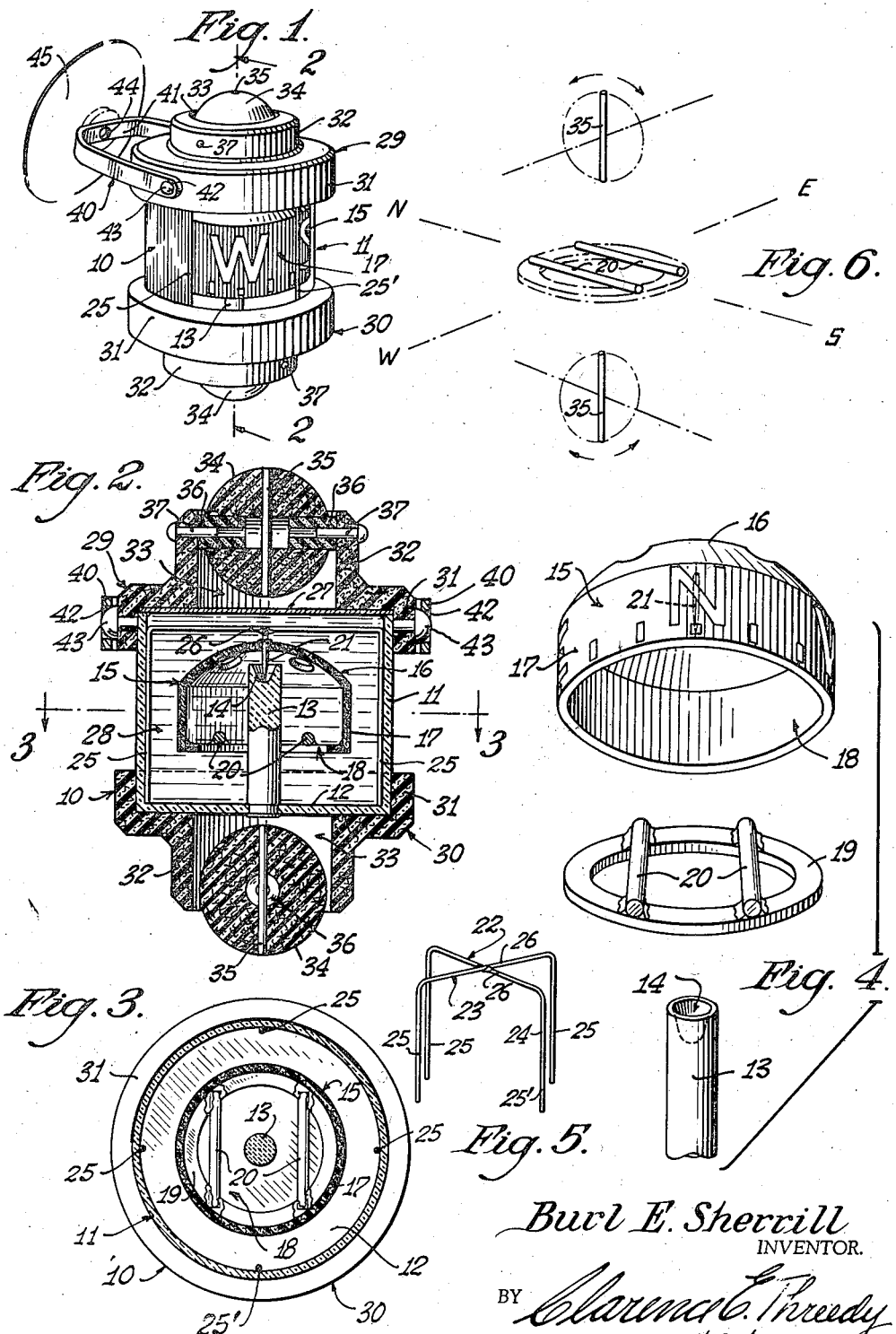
Burl E. Sherrill
INVENTOR.
BY Clarence E. Threedy
HIS ATTORNEY Patented Feb. 2, 1943

2,310,041

UNITED STATES PATENT OFFICE 2,310,041

COMPASS STRUCTURE

Burl E. Sherrill, Peru, Ind.

Application March 6, 1941, Serial No. 381,935

1 Claim. (Cl. 33—225)

This invention relates to magnetic compasses and more particularly to the improvement in construction of such compasses.

Another object of this invention is to provide a compact magnetic compass structure which is adapted to be readily applied or attached to vehicles or craft with which such instruments are generally used.

It is a further object to provide a housing for a magnetic compass which housing provides resilient walls which will permit expansion and contraction of the contents of the housing.

It is a still further object of this invention to provide in a compass assembly a novel compensator means whereby the compass may be readily corrected without the use of tools or other implements.

Other objects and advantages will appear more fully as the device is described in view of the drawing in which—

Fig. 1 is a perspective view of my new compass assembly;

Fig. 2 is a vertical sectional detail of the same as seen along line 2—2 in Fig. 1;

Fig. 3 is a horizontal cross-section as seen along line 3—3 in Fig. 2;

Fig. 4 is an exploded perspective view of certain elements which when assembled comprises a magnetic compass float;

Fig. 5 is a perspective view of a guard employed in my new assembly; while

Fig. 6 is a diagram illustrating the principal employed in my new compensator arrangement in a compass structure.

Referring to the drawing, my new compass comprises a body indicated at 10. This body consists of a cylindrical housing 11 of a transparent material such as cellulose which has a bottom wall 12 formed integrally therewith. A standard or post 13 of non-magnetic material is mounted concentrically within the housing 11 on the lower wall 12 and has its upper end formed to provide a cone-shaped recess or seat 14.

A float member 15 made of molded plastic in the form of an inverted cup provides a dome portion 16 having depending cylindrical side walls 17 to provide an open bottom end as at 18. To complete the float member 15 there is provided an annular ring 19 likewise formed of a plastic material and on this ring 19 there is arranged in parallelism with respect to each other a pair of bar magnets 20. The annular ring 19 is disposed in the open end 18 of the member 15 and is fixed thereto by means of cement or other suitable substance. A needle point 21 is arranged in the dome 16 coaxially with respect to the annular wall 17 depending therefrom. The float member 15 is arranged on the standard 13 with the pin 21 disposed in the seat formation 14 at the upper end of the standard, the magnets 20 being spaced equidistant from one horizontal axis through the ring 19, will then be disposed along the sides of the standard 13 as seen in Fig. 2.

A compass card or rhumb is provided on the side wall 17 to indicate the directions north, south, east and west respectively, such indicia being arranged to correspond with the position of the magnets 20 carried on the ring 19.

A guard 22, best illustrated in Fig. 5, is constructed of two separate pieces of wire 23 and 24 having their end portions 25 bent at right angles to a centermost portion 26 to provide U-shaped members, and these U-shaped members are then joined at the centermost point of the body portion 26 by solder or other suitable fixing means. This guard member is adapted to be placed over the float assembled on the standard 13 with the bottom ends of the legs 25 fixed to the bottom wall 12 of the housing by cementing the same. The housing 11 is then filled with a liquid 28 such as a special light oil of proper specific gravity and a circular disc 27 of very thin resilient material such as Celluloid, is then placed over the open upper end of the housing 11 and is cemented or otherwise secured to the housing to provide a seal at the upper end of the housing.

The construction explained in the foregoing exposition results in a magnetic compass within an annular housing 11 whereby the compass card on the side wall 17 of the float is legible through the side walls of the housing 11. The liquid content 28 in effect magnifies the indicia on the compass card and due to temperature conditions this liquid is disposed to expand or contract. To this end, the resilient end wall 27 of the housing 11 will provide a diaphragm which will flex correspondingly to the expansion or contraction of the contents of the housing 11. The jointed body portions of the guard member 22 will retain the float 15 on the standard 13 when the housing is tilted or otherwise shifted into an inverted angle. The portions 26 of the guard 22 further prevent the diaphragm 27 from engaging the top of the dome 16 under extreme contraction of the liquid 28 thereby assuring freedom of movement of the float member 15 at all times. The leg members 25 of the guard 22 are normally disposed at quarter points along the inner wall of the cylindrical housing 11 and one of the legs, designated 25', is adapted to constitute a "lubber line."

The compass contained in the housing 11 is adapted to be arranged between a pair of cap members 29 and 30. These members 29 and 30 are made of a molded plastic material and are formed to provide annular flanges 31 adapted to fit snugly over the end of the cylindrical housing 11, said fit preferably being assured against disassembly by the employment of a suitable solvent or cement. Each of the cap members 29 and 30 is formed to provide a cylindrical flange 32 to provide a tubular chamber 33 which communicates with the top and bottom walls of the housing. The flange 32 further provides a pivot mounting for a spherical element 34 which is also a molded plastic product and is cast with a magnetic metal bar 35 embedded in the material on the plane of one of its axes. The sphere 34 when cast is further adapted to embrace a pair of rubber bearings 36 arranged on a different axis of the sphere from the one in which the metal bar 35 is disposed and at right angles with respect thereto. The flange 32 has a pair of pins 37 extending therethrough with the inner ends of the pins 37 disposed in the tubular bearings 36 of the sphere 34, the rubber bearings 36 having frictional engagement with the inner walls of the tubular flange 32.

There is provided a bracket means 40 which comprises a U-shaped non-magnetic metal element 41 having openings 42 formed at the free ends of its legs and adapted to be sprung on to round head rivets 43 fixed in the annular flange 31 of the cap 29. The bight portion of the member 41 has a hole 44 formed therein which is adapted to fit on to a stock screw for fastening to a surface upon which the compass is to be mounted or the member 41 may be fastened to the conventional rubber suction cup indicated at 45 by which the instrument may be adapted to any surface desired.

It will be noted that the swivel mounting provided by the ball and socket connection 42—43 on the bracket 40 is disposed at a right angle with respect to an axis extending through the compass unit from the lubber line 25'. In this regard, attention is also called to the fact that the pivot mounting for the sphere 34 in the upper cap 29 is disposed on an axis which is in a plane parallel to the axis of the ball and socket mounting on the bracket 40 whereas the pivot mounting of the sphere 34 in the lower cap 30 is disposed on an axis parallel to a horizontal axis extending from the lubber line through the vertical axis of the housing 11. In other words, the sphere in the upper cap adapted to rotate about an axis which is disposed at right angles with respect to the axis of rotation of the sphere in the lower cap.

The arrangement and construction of the spheres 34 above and below the housing 11 provides a self-contained compensator whereby the compass may be readily adjusted to a correct reading in the event there are any discrepancies by reason of magnetic materials in the region of mounting of the device or in close proximity with respect thereto. To illustrate the compensator employed in my present invention, assume the body 10 has been mounted on the windshield of a car or motor vehicle; in order to check the characteristics of the magnetic compass it merely requires that the bars 35 in the spheres be disposed coaxially with the vertical axis of the housing 11 and the car faced due north. All things being equal, the compass card should then rotate into a position with the indicia "N" on the face 17 of the float 15 in alignment with the lubber line 25'. If, by reason of any magnetic influence in the vicinity of the mounting of the compass, the reading on the card does not show "north," the lowermost sphere 34 is then rotated by the thumb of the person effecting the adjustment until the indicia "N" comes into alignment with the lubber line 25'. The same check is made for east and west direction by moving the vehicle around to face in an easterly direction and if by reason of approximate magnetic disturbances the reading of the compass card does not show due east the uppermost sphere 34 will be rotated by the thumb or finger of the person effecting the adjustment until the float member comes to rest at a point indicating east on the compass card.

In summary, I have provided a simple and inexpensive compass float and a compass housing structure for said float employing a guard member which is adapted to provide a lubber line for the compass.

The construction of the compass body herein disclosed is relatively simple and very economical and provides a highly efficient construction of a compensator for magnetic compasses which requires no tools or other instrumentalities whatever when the compensator is to be adjusted to overcome the attraction created by bodies of magnetic materials in the vicinity of the position of mounting of such magnetic compasses. In addition to providing a novel construction of a compensator for magnetic compasses I have further provided an unbreakable body for a magnetic compass which cooperates with the latter to provide a neat and yet substantial and strong encasement for the delicate instrument with which it is employed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A magnetic compass comprising a housing having a liquid therein, a post centrally located within said housing, a compass member rotatably supported by said post, and compensating means for said compass member comprising end members at opposite corresponding ends of the housing and providing cylindrical projections, spherically shaped compensators rotatably mounted in the open ends of the projections with substantial portions thereof exterior of the projections to provide finger engaging portions whereby said compensating means may be manually rotated, means for rotatably supporting one of said compensators in the open end of the projection within which it is mounted, and means for rotatably supporting the other of the compensators in the open end of the projection with which it is mounted, whereby said other compensator may be rotated through an axis substantially at right angles with respect to the axis of rotation of the first said compensator, substantially as described.

BURL E. SHERRILL.